(12) United States Patent  (10) Patent No.: US 7,172,391 B2
Carvalho  (45) Date of Patent: Feb. 6, 2007

(54) PROPELLER ACTUATION SYSTEM

(75) Inventor: Paul Armand Carvalho, Westfield, MA (US)

(73) Assignee: Hamilton Sundstrand, Windsor Locks, CT (US)

( * ) Notice: Subject to any disclaimer, the term of this patent is extended or adjusted under 35 U.S.C. 154(b) by 144 days.

(21) Appl. No.: 10/910,135

(22) Filed: Aug. 3, 2004

(65) Prior Publication Data
US 2006/0029496 A1    Feb. 9, 2006

(51) Int. Cl.
B64C 11/38    (2006.01)
(52) U.S. Cl. .................. 416/1; 416/157 A; 60/405
(58) Field of Classification Search ........... 416/1, 416/159, 162, 156, 157 A, 157 B; 60/455, 60/405, 486
See application file for complete search history.

(56) References Cited

U.S. PATENT DOCUMENTS

| | | | | |
|---|---|---|---|---|
| 2,373,360 A | * | 4/1945 | Walsh | 184/6.13 |
| 3,370,652 A | * | 2/1968 | Stranks | 416/42 |
| 3,560,108 A | * | 2/1971 | Lindahl | 416/157 R |
| 5,122,036 A | * | 6/1992 | Dickes et al. | 417/222.1 |
| 5,186,608 A | | 2/1993 | Bagge et al. | |
| 5,897,293 A | | 4/1999 | Arel et al. | |
| 6,729,844 B2 | * | 5/2004 | Bettencourt | 416/1 |
| 2005/0135929 A1 | * | 6/2005 | Waddleton | 416/1 |

FOREIGN PATENT DOCUMENTS

GB    684 490    12/1952

OTHER PUBLICATIONS

European Search Report, Dec. 12, 2005.

* cited by examiner

*Primary Examiner*—Edward K. Look
*Assistant Examiner*—Nathan Wiehe
(74) *Attorney, Agent, or Firm*—Carlson, Gaskey & Olds

(57) ABSTRACT

An auxiliary tank is filled by a pitch control system, which enables the size of the auxiliary tank to be reduced.

19 Claims, 2 Drawing Sheets

PROPELLER ACTUATION SYSTEM

BACKGROUND OF THE INVENTION

This invention relates to a propeller actuation system for an aircraft. More particularly, the invention relates to a system and method of storing hydraulic fluid in a auxiliary tank for use in changing the pitch of a propeller blade.

Aircraft having propellers typically include a propeller actuation system for changing the pitch of the propeller blades during in-flight conditions and ground maintenance conditions. The blade pitch is typically changed using a main hydraulic pump driven by a gearbox mechanically connected to an engine that drives the propeller. Fluid from a main tank is provided to the main hydraulic pump, which supplies the fluid to a propeller control system that changes the blade pitch. The main hydraulic pump and main tank are used during normal in-flight operation of the aircraft.

Conditions arise in which it is undesirable or difficult to use the main hydraulic pump and main tank to change the blade pitch. For example, during an in-flight condition in which the main hydraulic pump becomes inoperable or the system associated with the main tank becomes inoperable, an auxiliary control system is used to change the blade pitch. In the example of an engine failure, the auxiliary pump, which is fed by an auxiliary tank, supplies fluid to the propeller control system to move the blades to a feather position for emergency aircraft operation.

The auxiliary control system may also be employed during ground maintenance procedures. For example, it may be desirable to move the blades from a feather position to a reverse position and back to a feather position to exercise the blades or place the blades in a position that provides access to the propeller and other components for service.

The auxiliary tank of the auxiliary control system provides a volume sufficient to store fluid needed during in-flight and ground maintenance conditions to effectuate a desired change in blade pitch. Prior art systems have employed a large auxiliary tank to provide the needed volume of fluid. The auxiliary tank was filled with fluid from a lube system of the gearbox, which is not replenished if the gearbox is not driven by the engine. As a result, there is a need for a large auxiliary tank to account for conditions in which the engines is not running and a change in blade pitch is desired. Large auxiliary tanks create weight and packaging penalties for the aircraft.

What is needed is a reduced size auxiliary tank and a propeller actuation system designed to supply the desired volume of fluid to the auxiliary tank without compromising the ability to change blade pitch during in-flight and ground maintenance conditions.

SUMMARY OF THE INVENTION

A propeller actuation system includes a propeller having blades. A propeller control system includes a pitch change actuator that is operatively connected to the propeller for changing the blade pitch. A propeller control selectively provides a fluid to the pitch change actuator to change the blade pitch. An auxiliary tank receives fluid from the propeller control system. For example, fluid leaking from the propeller control or returning from the pitch change actuator is provided to the auxiliary tank. An auxiliary pump is fluidly coupled to the auxiliary tank. The auxiliary pump provides a fluid from the tank to the propeller control system in response to a pitch change request, which may occur during in-flight and ground maintenance conditions.

The present invention provides a method of changing propeller pitch by filling an auxiliary tank with fluid from the propeller control system. By way of contrast, the auxiliary tank was filled using fluid from the gearbox, which resulted in a larger than desired auxiliary tank. The method further includes a pitch change request and providing the fluid to the propeller control system from the auxiliary tank in response to the pitch change request to effectuate a change in propeller blade pitch.

In this manner, the present invention provides what is needed is a reduced size auxiliary tank and a propeller actuation system designed to supply the desired volume of fluid to the auxiliary tank without compromising the ability to change blade pitch during in-flight and ground maintenance conditions.

These and other features of the present invention can be best understood from the following specification and drawings, the following of which is a brief description.

DETAILED DESCRIPTION OF THE PREFERRED EMBODIMENT

Figure 1:
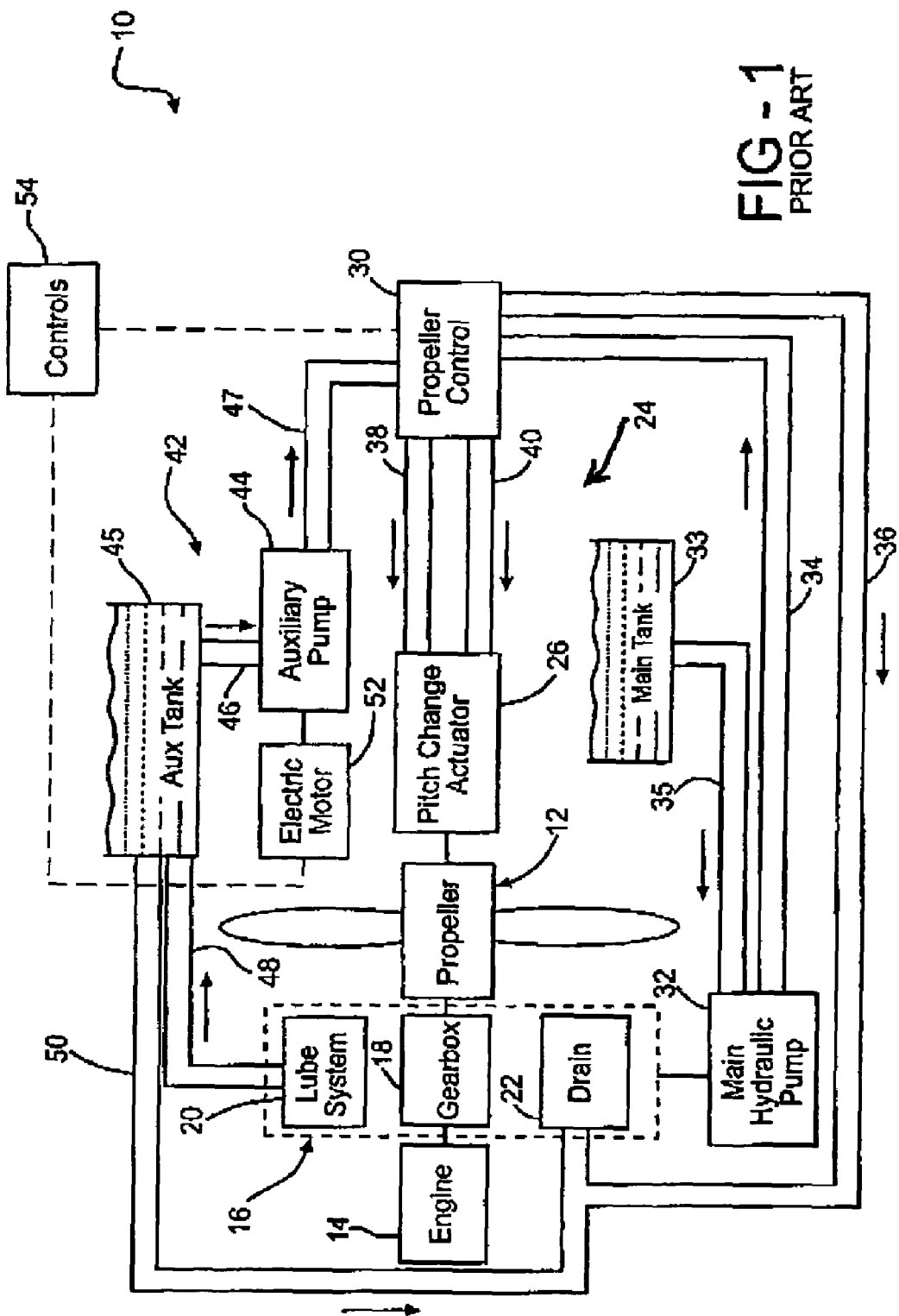
FIG. 1 is a schematic view of a prior art propeller actuation system.

FIG. 1 schematically depicts a prior art propeller actuation system. The propeller actuation system 10 includes a propeller 12 typically including multiple blades. The propeller 12 is driven by an engine 14 through a gearbox system 16. The gearbox system 16 includes a gearbox 18 having various gears to achieve a desired gear ratio. The gearbox system 16 also includes a lube system 20 for circulating fluid throughout the gearbox system 16 and a drain 22 for receiving the fluid back into the gearbox system 16.

A pitch control system 24 is used to change the pitch of the propeller blades as desired. The pitch control system 24 includes a pitch change actuator 26 that is typically housed within a hub (not shown) on the propeller 12. A propeller control 30 selectively provides fluid to the pitch change actuator 26 to move the propeller blades back and forth. The propeller control 30 is typically arranged between the engine 14 and gearbox 18, although in the schematic the propeller control 30 is shown positioned elsewhere for clarity.

The propeller blades are movable between a flight idle position, which is the minimum in-flight pitch, and a full feather condition in which the blades are arranged in a longitudinal orientation to minimize the propulsion generated by the propeller 12. The propeller blades are also movable to a reverse position, which represents a position that is an opposite orientation from the full feather position.

The propeller control 30 includes various components and features that will not be discussed in detail since they are well known in the art. For example, the propeller control 30 may include a safety override device, metering valves, pressure relief valves, pitch lock signals, and other known devices. The pitch change actuator 26 is of the type known in the art. The pitch change actuator 26 manipulates the propeller blades in a desired direction depending upon the fluid entering the pitch change actuator 26 from the propeller control 30.

A main hydraulic pump 32 is typically mounted to the gearbox system 16 and is driven by the gearbox 18. A main tank 33 includes a main tank volume for storing fluid. The main tank 33 provides fluid to the main hydraulic pump through a main pump supply line 35. The main hydraulic pump 32 supplies fluid to the propeller control 30 through a supply line 34.

The propeller control 30 leaks internally during normal operation. For example, an electro hydraulic servo valve and oil transfer bearing leak during normal operation. Accordingly, the fluid leaking from the propeller control is returned to the drain 22 in prior art systems, one of which is shown in FIG. 1.

The propeller control 30 is fluid coupled to the pitch change actuator 26 by first and second directional supply lines 38 and 40. Depending upon the direction of pitch desired, the propeller control 30 selectively provides fluid to the pitch change actuator 26 through either the first or second directional supply lines 38 and 40.

As can be appreciated from the schematic, the main hydraulic pump 32 will no longer be able to supply pressurized fluid to the propeller control 30 in the event of a malfunctioning or inoperable engine since the main hydraulic pump 32 is mechanically driven by the gearbox 18, which is in turn driven by the engine 14. To this end, an auxiliary control system 42 is utilized to provide pressurized fluid to the propeller control 30 during various conditions.

The auxiliary control system 42 includes an auxiliary pump that is driven by an electric motor 52. The auxiliary pump 44 is fed fluid from an auxiliary tank 45 through an auxiliary pump supply line 46. The auxiliary pump 44 provides pressurized fluid to the propeller control 30 through a supply line 47.

The auxiliary tank 45 provides an auxiliary tank volume that is filled with fluid from an auxiliary tank supply line 48 that is fluidly connected to the lube system 20 of the gearbox system 16. Fluid in excess of the volume provided by the auxiliary tank 45 is returned to the drain 22 through an auxiliary tank return line 50.

Controls 54 are used to control the propeller control 30 during in-flight and/or ground maintenance conditions. The control 54 are shown schematically connected to the propeller control 30 and the electric motor 52 for exemplary purposes. In one example, during an in-flight condition in which the main hydraulic pump 32 is unable to provide pressurized fluid to the propeller control 30, the pilot can provide pressurized fluid to the propeller control 30 by actuating the electric motor 52 to drive the auxiliary pump 44. In another example, for a ground maintenance condition, maintenance personnel can change the blade pitch to service the propeller actuation system 10 by actuating electric motor 52 using the controls 54 when the engine 14 is not running or inoperable. It may be desirable to change the blade pitch for ground maintenance, for example, to remove the pitch change actuator 26, gain access to the spinner or various screws, or exercise the propeller blades after service to the propeller assembly.

As can be appreciated, the auxiliary tank 45 needs to store a volume of fluid sufficient to change the propeller pitch during various in-flight and ground maintenance conditions. However, having a larger auxiliary tank 45 than necessary creates a significant size and weight penalty. To address these concerns, the present invention has achieved a small auxiliary tank size by rerouting the flow of fluid through the propeller actuation system while maintained desired power actuation operating parameters. In one example, the prior art auxiliary tank is twice as large as the inventive auxiliary tank while achieving the same design parameters as the prior art system.

Figure 2:
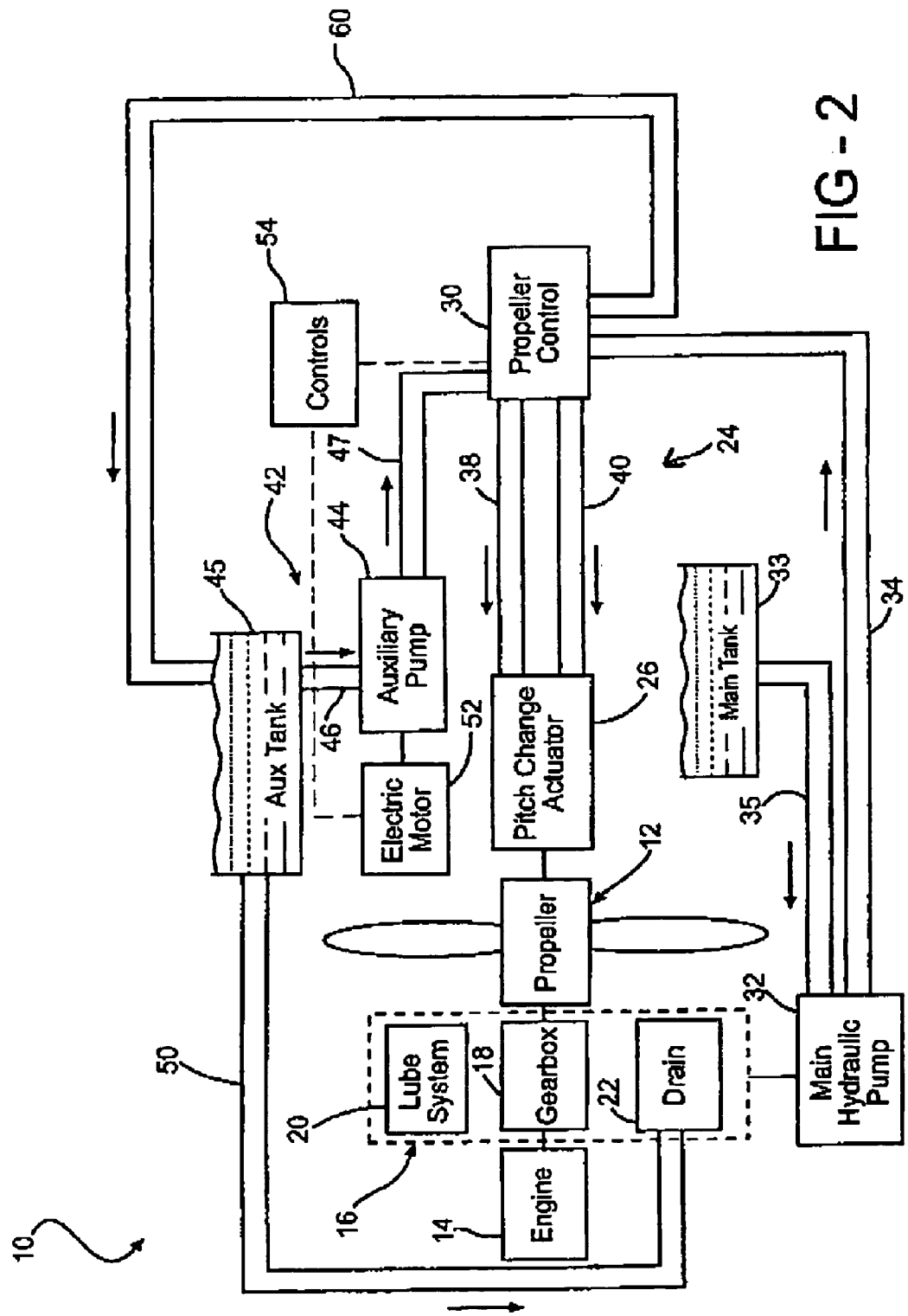
FIG. 2 is a schematic view of the inventive propeller actuation system.

Referring to FIG. 2, leakage from the propeller control 30 is routed through an auxiliary fill line 60 to the auxiliary tank 45 instead of being routed to the drain 22, as shown in FIG. 1. The auxiliary tank 45 is no longer filled using the lube system 20. Excess fluid from the auxiliary tank 45 returns to the drain 22. Furthermore, return fluid flow from the pitch change actuator back to the propeller control 30 is also provided to the auxiliary tank 45 through the auxiliary fill line 60.

The fluid provided by the propeller control 30 continues after the engine 14 and gearbox 18 stop rotating so that there is an adequate amount of fluid provided to the auxiliary tank 45.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A propeller actuation system comprising:
   a propeller;
   a propeller control system including a pitch change actuator operatively connected to the propeller for changing a propeller pitch, and a propeller control selectively providing a fluid to the pitch change actuator to change the propeller pitch;
   an auxiliary tank interconnected to the propeller control by an auxiliary fill line, the auxiliary tank receiving the fluid from the propeller control through the auxiliary fill line; and
   an auxiliary pump fluidly coupled to the auxiliary tank, the auxiliary pump providing the fluid to the propeller control in response to a pitch change request.

2. The propeller actuation system according to claim 1, the auxiliary tank is fluidly connected between the propeller control and a gearbox drain, the auxiliary tank defining a volume for storing the fluid, the gearbox drain receiving fluid from the auxiliary tank when the fluid in the tank exceeds the volume.

3. The propeller actuation system according to claim 1, comprising a gearbox driving the propeller, and a main pump driven by the gearbox in a running condition to provide fluid to the propeller control, the main pump fed with fluid from a main tank the auxiliary pump providing fluid to the propeller control in a non-running condition with the main pump inoperable.

4. The propeller actuation system according to claim 3, the main tank having a main tank fluid volume separate from an auxiliary tank fluid volume of the auxiliary tank.

5. The propeller actuation system according to claim 1, wherein the propeller control is fluidly connected between a main pump and the auxiliary tank, fluid flowing from the main pump through the propeller control and into the auxiliary tank.

6. The propeller actuation system according to claim 1, wherein the propeller control is fluidly connected between the auxiliary pump and the auxiliary tank, fluid flowing from the auxiliary pump through the propeller control and into the auxiliary tank.

7. The propeller actuation system according to claim 6, wherein an electric motor drive the auxiliary pump.

8. The propeller actuation system according to claim 1, wherein the pitch change request corresponds to a feathered position of a propeller.

9. The propeller actuation system according to claim 1, comprising a control sending the pitch change request during an in-flight condition.

10. The propeller actuation system according to claim 1, comprising a control send the pitch change request during a ground maintenance condition.

11. A method of changing propeller pitch comprising the steps of:
   a) filling an auxiliary tank with fluid from a propeller control;
   b) receiving a pitch change request; and
   c) providing the fluid to the propeller control from the auxiliary tank in response to the pitch change request to effectuate a change in propeller pitch.

12. The method according to claim 11, wherein the fluid from step a) is provided by leakage from a propeller control of the propeller control.

13. The method according to claim 11, wherein the fluid from step a) is provided by return flow from an actuator to a propeller control, both of which are of a propeller control system.

14. The method according to claim 11, wherein step b) occurs during in-flight conditions.

15. The method according to claim 14, wherein step c) includes moving a propeller blade from a flight idle position to the feathered position.

16. The method according to claim 11, wherein step b) occurs during ground maintenance conditions.

17. The method according to claim 16, wherein step c) includes moving a propeller blade between a feathered position and a reverse position that is a different orientation that the feathered position.

18. The method according to claim 11, wherein the pitch change request corresponds to a feathered blade position.

19. The method according to claim 11, wherein step c) includes feeding an auxiliary pump with fluid from the auxiliary tank, the auxiliary pump driven by an electric motor.

* * * * *